Jan. 14, 1964 R. W. HERR ETAL 3,117,771
POSITIONING DEVICE FOR A ROTATABLE MEMBER
Filed July 9, 1962 3 Sheets-Sheet 1

Inventors:
Robert W. Herr,
Arthur C. Keck,
by Hood, Gust & Irish
Attorneys.

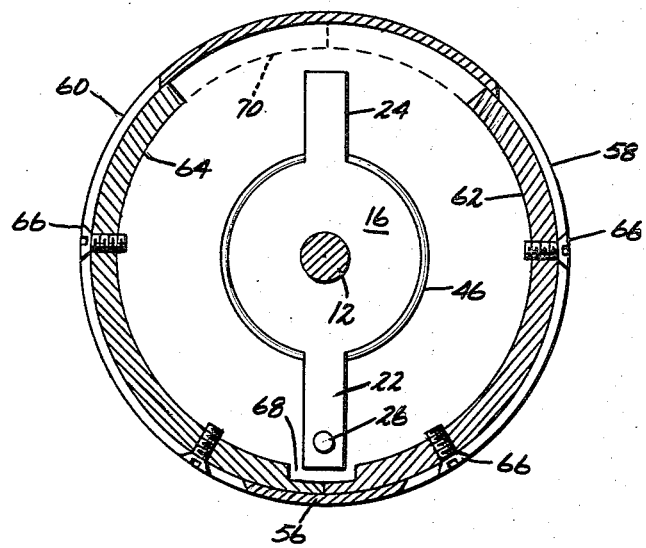
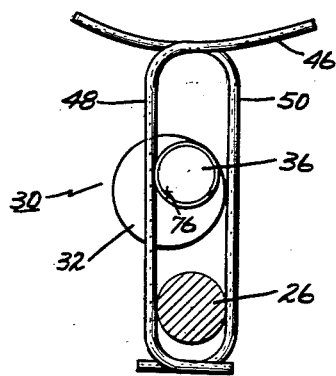
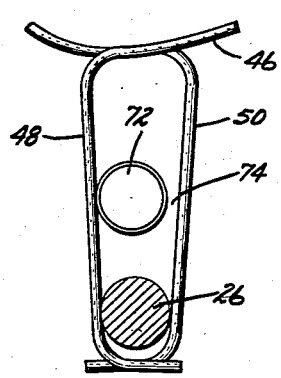
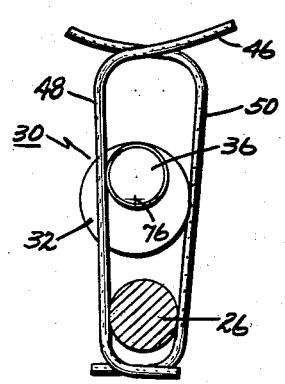
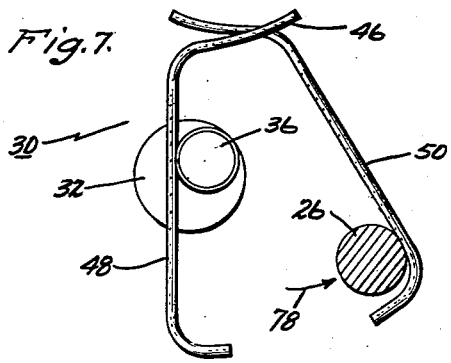

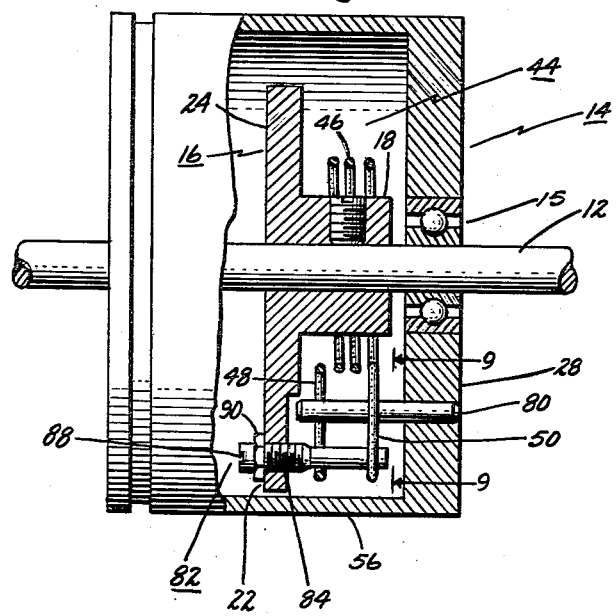
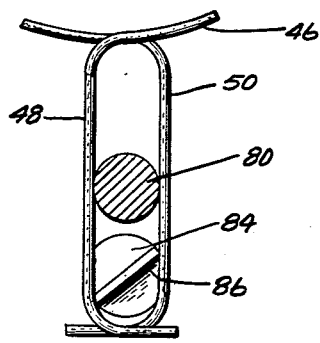
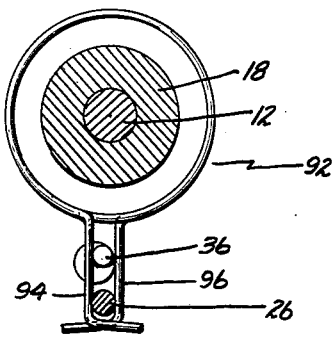

United States Patent Office 3,117,771
Patented Jan. 14, 1964

3,117,771
POSITIONING DEVICE FOR A ROTATABLE
MEMBER
Robert W. Herr and Arthur C. Keck, Fort Wayne, Ind., assignors to Bowmar Instrument Corporation, Fort Wayne, Ind.
Filed July 9, 1962, Ser. No. 208,346
13 Claims. (Cl. 267—1)

This invention relates generally to devices for returning a rotatable member to a first predetermined rotational position from a second position angularly spaced therefrom, and more particularly to spring return devices to return a rotatable shaft to a predetermined position.

In many electro-mechanical systems, such as servo systems, it is desirable accurately to return a rotatable shaft to a predetermined rotational position from a position angularly spaced therefrom when the input torque on the shaft is removed. For example, a servo-mechanism gear train may, when energized by an external command signal, drive the shaft of a rotary potentiometer to a position corresponding to the amplitude of the command signal and it may be desired thereafter to return the potentiometer shaft to a predetermined null position with minimum angular error when the command signal is removed.

It has been common practice to employ a spring return device to accomplish this objective. Such spring return devices have conventionally comprised a driving member secured to the shaft and rotatable therewith and having a portion extending radially outward therefrom with an elongated pin secured to the outwardly extending portion of the driving member and extending axially outwardly therefrom in spaced parallel relationship with the axis of the shaft. A second elongated pin is provided secured to a stationary member and extending axially outwardly therefrom in spaced parallel relationship with the first pin and with the axis of the shaft, the first and second pins and the axis of the shaft being in radial alignment when the shaft is in the desired predetermined rotational position. A torsion coil spring is provided coaxial with the shaft with its two ends extending outwardly in transversely generally spaced parallel relationship, the two spring ends normally being biased toward and respectively resiliently engaging opposite sides of the two pins when the shaft and driving member are in the predetermined rotational position. With this arrangement, rotation of the shaft and driving member in either direction away from the predetermined rotational position causes the first pin on the driving member to deflect one of the spring ends thus winding-up the torsion coil spring so that when the driving torque is removed from the shaft, the deflected end of the spring under the influence of the spring wind-up will restore the first pin, the driving member and the shaft to the normal position.

Such prior spring return devices, as produced in quantity production even with close tolerances, have not been capable of returning the shaft to the requisite predetermined rotational position with an accuracy better than a ±3° of angle. Where greater accuracy was required, it has been the practice manually to bend the spring ends of an individual device with a suitable tool and by this technique, it has been possible to obtain individual spring return devices capable of returning the shaft to the predetermined position with an accuracy of a ±7' of angle. Such manual adjustments must be made prior to assembly of the device or in the alternative require disassembly of the device, are at best time consuming, and further there are instances in which still greater accuracy of shaft return is required. It is therefore desirable to provide a spring return device wherein greater accuracy of shaft return may be obtained than has heretofore been provided, by means of a simple adjustment which does not necessitate manually bending or manipulating the spring ends.

It is accordingly an object of the invention to provide an improved spring return mechanism capable of greater accuracy of shaft return than has heretofore been provided.

Another object of this invention is to provide an improved spring return device incorporating a simple adjustment for accuracy of shaft return which does not require manipulation or bending of the ends of the coil spring.

Further objects and advantages of the invention will become apparent by reference to the following description and the accompanying drawings, and the features of novelty which characterize the invention will be poined out with particularity in the claims annexed to and forming a part of this specification.

The invention is embodied in a device for returning a rotatable member to a first predetermined rotational position from a second position angularly displaced therefrom. In this device, a driving member is provided secured to the rotatable member and rotatable therewith and having a portion extending radially outwardly from the rotatable member. A first elongated element is secured to the outwardly extending portion of the driving member and extends axially outwardly therefrom in spaced parallel relationship with the axis of the rotatable member. A stationary member is provided and a second elongated element is secured to the stationary member and extends axially outwardly therefrom in spaced parallel relationship with the first elongated element and the axis of the rotatable member, the first and second elongated elements and the axis being in radial alignment when the rotatable member is in its first predetermined position. Spring means are provided having two spaced elongated portions normally biased toward and respectively resiliently engaging opposite sides of the elongated elements when the rotatable member is in its first position whereby rotation of the rotatable member toward its second position causes the first elongated element to deflect one of the spring means portions. In accordance with the invention, one of the elongated elements has one transverse dimension, greater than the normal spacing between the spring means portions when the rotatable member is in its first position, and another transverse dimension less than the normal spacing. The one elongated element is adjustably secured to the respective member for movement so that side surfaces thereof respectively engage both of the spring means portions when the rotatable member is in its first position whereby both of the spring means portions engage both of the elongated elements thereby minimizing lost motion of the rotatable member in the first predetermined position thereof.

In the drawing:

FIG. 3 is a cross-sectional view taken along line 3—3 of FIG. 1;

FIG. 4 is a fragmentary end view of the spring end and pin construction of prior spring return devices;

FIG. 5 is a fragmentary view of the spring end and eccentric pin construction of FIG. 1;

FIG. 6 is a fragmentary end view of the spring end and eccentric pin arrangement of FIG. 1 showing adjustment thereof to accommodate distortion of the spring ends;

FIG. 7 is a fragmentary end view showing the spring end and pin arrangement of FIG. 1 with the shaft rotated from its predetermined position;

FIG. 8 is a side view, partly in cross-section illustrating another embodiment of the invention;

FIG. 9 is a fragmentary end view of the spring end and pin construction of the embodiment of FIG. 8; and FIG. 10 is a fragmentary end view showing a modified form of spring.

Figure 1:
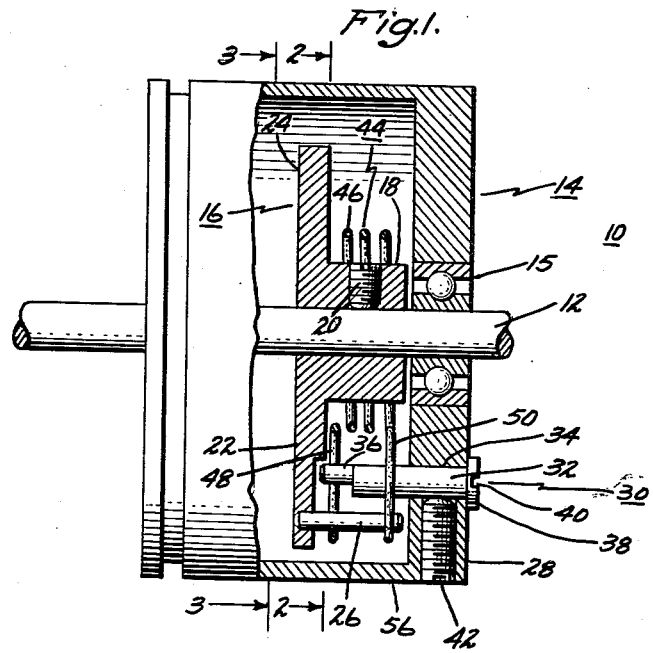
FIG. 1 is a side view, partly in cross section, illustrating one embodiment of the invention.
Figure 2:
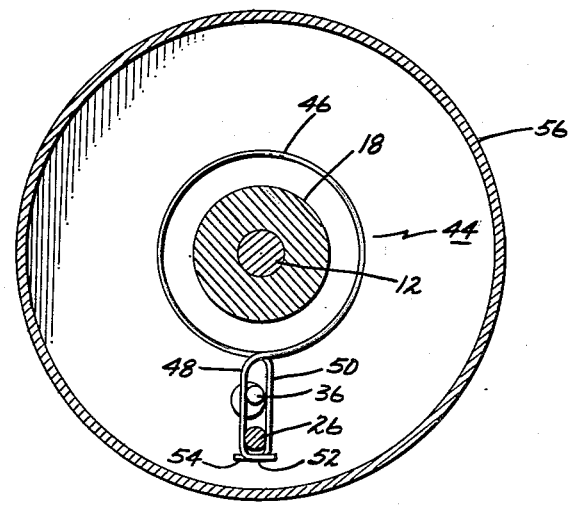
FIG. 2 is a cross-sectional view taken along the line 2—2 of FIG. 1.

Referring now to FIGS. 1, 2 and 3 of the drawing, there is shown a spring return device, generally indicated at 10, comprising a rotatable shaft 12 journaled in a suitable housing 14 by means of suitable bearings 15. The shaft 12 may, for example, have one end thereof connected to or formed integrally with the shaft of a driving device, which may be a magnetic clutch, and may have its other end connected to or integrally formed with a driven device, such as a potentiometer or synchro. It will be readily understood that the housing 14 may be independently mounted or may be secured to the driven device and/or the driving device. It will further be understood that in the event that shaft 12 is integrally formed with the shaft of either the driving or driven device, the bearing 15 may be eliminated, shaft 12 being rotatably supported in that event by bearings in the driving or driven device.

A driving member 16 is provided having a hub portion 18 secured to the shaft 12 in any suitable manner, as by means of set screw 20. Driving member 16 has a portion 22 extending radially outwardly from shaft 12 and another radially extending portion 24 diametrically opposite from portion 22 for dynamic balancing purposes.

A first cylindrical pin 26 is secured to portion 22 of driving member 16 and extends axially outwardly therefrom toward end wall 28 of housing 14 in spaced parallel relationship with the axis of shaft 12.

An adjustable pin 30 is provided having a cylindrical portion 32 rotatably seated in opening 34 in end wall 28 and extending axially outwardly toward driving member 16 in spaced parallel relationship with pin 26 and the axis of shaft 12. Pin 30 has an eccentric portion 36 formed on its end toward driving member 16 and has a head 38 with a screw driver slot 40 formed therein on its other end exteriorly of the end wall 28.

The relative positions of pins 26 and 30 in the normal or null position of the shaft 12 is shown in FIGS. 2, 5 and 6 and it will be observed that in this position of the shaft, the pins 26 and 30 and the shaft 12 are disposed in general radial alignment.

A torsion coil spring 44 is provided having a coiled body portion 46 surrounding hub 18 of driving member 16 and generally coaxial therewith. The two ends 48 and 50 of spring 44 are respectively crossed over, as best seen in FIGS. 2, 5 and 6, and normally extend outwardly from the body portion 46 in axially and transversely spaced apart relationship. In the predetermined or null position of shaft 12, spring end 48 engages one side surface of eccentric portion 36 of pin 30 and one side surface of pin 26, and the other spring end 50 engages a side surface of cylindrical portion 32 of pin 30 and an opposite side surface of pin 26, the spring ends 48 and 50 being biased into resilient engagement with the respective surfaces of the pins 26, 30 by the coiled portion 46 and by virtue of their crossed-over relationship. The two spring ends 48, 50 respectively have hook portions 52, 54 which serve to retain spring 44 in its proper position.

Referring particularly to FIG. 3, in the illustrated embodiment, it is desired to limit the rotation of shaft 12 and driving member 16 away from the predetermined or null position. To accomplish this limitation, cylindrical portion 56 of housing 14 has a pair of circumferentially extending slots 58 and 60 formed therein. A pair of adjustable stop members 62 and 64 are provided within housing portion 56 and adjustably secured thereto by means of screws 66 respectively seated in the slots 58, 60. The stop members 62, 64 have shoulder portions 68 which are adapted to engage portion 22 of driving member 16 and thus to limit its rotation. As will be seen in FIG. 3, stops 62, 64 may be selectively adjusted between the position shown in solid lines in FIG. 3 and the position shown in dashed lines 70 in FIG. 3.

Referring now to FIG. 4, conventional prior spring return mechanisms incorporated equal diameter cylindrical pins 26 and 72 respectively secured to the driving and stationary members. It will be readily seen that in order to provide for accurate return of the driving member and shaft to the predetermined or null position, the two spring ends 48 and 50 should be respectively in tangential engagement with the opposite side surfaces of the pins 26, 72 in the normal position so as to eliminate lost motion and resulting error in return. However, it will be readily comprehended that it is extremely difficult if not, in fact, virtually impossible in production to provide springs wherein the spring ends 48, 50 will be exactly parallel and respectively in tangential engagement with both opposite sides of both pins 26, 72; in most instances the spring ends 48, 50 will initially be positioned so that they are making only three tangential contacts with pins 26, 72, as shown in FIG. 4, thus providing lost motion space 74 between one of the spring ends and one of the pins; this lost motion provides a corresponding inaccuracy in return of the driving member and shaft to the predetermined position. Efforts have been made in the past to eliminate this lost motion and to provide four-point contact of the spring ends with the two pins by manually bending one or both of the spring ends with pliers, however, it will be readily apparent that this is at best a time consuming task and that securing four-point tangential contact of the spring ends with the opposite sides of both pins is still difficult if not impossible to attain. It has also been proposed to employ pins of different diameters in order to accommodate initial non-parallel condition of the spring ends, however, this requires individually sizing the two pins in each device and will be recalled that devices of this type are most commonly of the miniature variety.

Referring now to FIGS. 5 and 6, it will be observed that in accordance with the invention, the eccentric portion 36 of pin 30 which engages only spring end 48 has a diameter less than the normal transverse spacing between spring ends 48, 50 as shown in FIG. 5, and that the cylindrical portion 32, which engages only spring end 50 has a diameter greater than the normal transverse spacing between spring end 48, 50. With this arrangement, after the device has been assembled, it is merely necessary to rotate the pin 30 until eccentric portion 36 and cylindrical portion 32 respectively engage both spring ends 48, 50 following which the set screw 42 is tightened to lock the pin 30 in its adjusted position. If the spring ends 48, 50 are generally transversely parallel, the eccentric portion 36 will be positioned as shown in FIG. 5, however, if the spring ends 48, 50 initially are other than parallel, rotation of cylindrical portion 32 of pin 30 on about its axis 76 will position eccentric portion 36 as shown in FIG. 6.

It will now be readily seen that with the invention, the respective dimensions of pins 26 and 30 are not critical since the pin 30 is readily adjusted to provide the requisite four-point tangential contact of the pins with the spring ends. Further it will be seen that the initial normal positioning of the spring ends is not critical since again any non-parallel condition is compensated for by adjustment of the pin 30. The invention, therefore, provides a simple and positive external adjustment to eliminate lost motion in the spring return mechanism, thus eliminating the necessity for minute manual adjustment of the spring ends previously required. With the invention, return of the shaft within ±1' of angle is readily accomplished and, in fact, devices in which there is no perceptible error in return (subject to temperature variation) may be obtained.

Referring briefly to FIG. 7, it will be observed that when the shaft 12 is rotated away from its predetermined or null position thus in turn rotating portion 22 of driving member 16, pin 26 will likewise be rotated about the axis or shaft 12, as shown for example by the arrow 78 thus deflecting spring end 50 and winding-up the body portion 46 of spring 44. When the driving torque on shaft 12 is removed, it will be seen that the spring force exerted by body portion 46 of spring 44 through spring end 50 will return pin 26, and thus driving member 16 of shaft 12 to the normal position with spring ends 48, 50 respectively engaging portions 36 and 32 of pin 30 and pin 26, as shown in FIGS. 2, 5 and 6. It will be readily seen that if the shaft 12 is rotated in the opposite direction from that shown by the arrow 78, pin 26 will cause deflection of spring end 48 rather than spring end 50.

Referring now to FIGS. 8 and 9 in which like elements are indicated by like reference numerals, it will be seen that cylindrical pin 80 is secured in end portion 8 of stationary housing 14 and extends axially toward driving member 16 in spaced parallel relationship with shaft 12, and that adjustable pin 82 is adjustably secured to portion 22 of driving member 16. Here, adjustable pin 82 has a cylindrical portion 84 threaded in a suitable opening in portion 22 of driving member 16, and a flattened portion 86 which extends axially outwardly toward end wall 28 of housing 14 in spaced parallel relationship with pin 80 and shaft 12. It will be seen by reference to FIG. 9 that the thickness of the flattened portion 86 is less than the normal transverse spacing between spring ends 48, 50 however, that the transverse width of flattened portion 86 is greater than the normal transverse spacing of the spring ends 48, 50. Thus upon assembly of the device, pin 82 is merely rotated by means of its screwdriver slot 88 thereby rotating the flattened portion 86 until it reaches a position in which the spring ends 48, 50 engage the opposite surfaces of pin 80 and the opposite edges of flattened portion 86, thus again providing the requisite four-point contact of the spring ends 48, 50 with the two pins in the predetermined or null position of the shaft 12. A suitable nut 90 may be provided for locking the adjustable pin 82 in its selected position.

The above-described embodiments have incorporated a spring having crossed-over ends and thus is of the type which is wound-up when the shaft is rotated. Referring now to FIG. 10 in which like elements are indicated by like reference numerals, it will be seen that spring 92 is of the type in which ends 94, 96 are not crossed-over and thus, spring 92 will unwind as the shaft 12 is rotated. Employment of such a spring may be desirable in certain instances since a closer initial relationship of the inside diameter of the spring to the outside diameter of the hub can be provided; since the spring unwinds, there is no tendency for it to bind on the hub, the inside diameter of the spring increasing as the shaft is rotated.

While there are illustrated and described specific embodiments of the invention, further modifications and improvements will occur to those skilled in the art and it is desired, therefore, to cover all modifications which do not depart from the spirit and scope of the invention.

What is claimed is:

1. In a device for returning a rotatable member to a first predetermined rotational position from a second position angularly spaced therefrom comprising a driving member secured to said rotatable member and rotatable therewith and having a portion extending radially outwardly from said rotatable member, a first elongated element secured to said portion of said driving member and extending axially outwardly therefrom in spaced parallel relationship with the axis of said rotatable member, a second elongated element secured to a stationary member, and extending axially therefrom in spaced parallel relationship with said first elongated element and said axis, said first and second elongated elements and said axis being in general radial alignment when said rotatable member is in said first position, and spring means having two spaced elongated portions normally biased toward and respectively resiliently engaging opposite sides of said elongated elements when said rotatable member is in said first position whereby rotation of said rotatable member toward said second position causes said first elongated element to deflect one of said spring means portions; the improvement wherein one of said elongated elements has one transverse dimension greater than the normal spacing between said spring means portions when said rotatable member is in said first position and another transverse dimension less than said normal spacing, said one elongated element being adjustably secured to the respective member for movement so that side surfaces thereof respectively engage both said spring means portions when said rotatable member is in said first position whereby both of said spring means portions engage both of said elongated elements thereby minimizing lost motion of said rotatable member in said first portion thereof.

2. The device of claim 1 wherein said one elongated element has one end thereof rotatably adjustably secured to the respective member and its other end extending axially outwardly therefrom.

3. The device of claim 2 wherein said other end of said one elongated element is generally flattened in cross-section to define said one and other transverse dimensions.

4. The device of claim 2 wherein said one end of said one elongated element defines said one transverse dimension and said other end has a portion eccentric with respect to said one end to define said other transverse dimension.

5. The device of claim 1 wherein said one elongated element is secured to said stationary member.

6. The device of claim 1 wherein said one elongated element is secured to said driving member.

7. The device of claim 1 wherein said spring means is a torsion coil spring with the ends thereof defining said two elongated portions.

8. The device of claim 1 wherein said spring means is a torsion coil spring generally coaxial with said axis, the ends of said spring defining said two elongated portions and normally extending outwardly therefrom in transversely generally spaced parallel relationship, said spring ends being axially spaced apart, said one elongated element having one cylindrical end portion rotatably adjustably secured to the respective member, said one end portion defining said one transverse dimension and being engaged by one of said spring ends, said one elongated element having its other end portion eccentric with respect to said one end portion, said other end portion defining said other transverse dimension and being engaged by the other of said spring ends.

9. The device of claim 8 wherein said one elongated element is rotatably adjustably secured to and extends through a portion of said stationary member, and further comprising means on said one end portion of said one elongated element externally of said stationary member portion for selectively rotating said one elongated element, and means for locking said one elongated element in a selected rotational position.

10. The device of claim 9 wherein the other elongated element is disposed radially outwardly from said one elongated element in said first position of said rotatable member.

11. The device of claim 1 wherein said spring means is a torsion coil spring generally coaxial with said axis, the ends of said spring defining said two elongated portions and normally extending outwardly therefrom in transversely generally spaced parallel relationship, said spring ends being axially spaced apart, one of said elongated elements having one cylindrical end portion rotatably secured to the respective member, said one elongated element having its other end portion generally flattened in cross-section to define said one and other transverse dimension, said spring ends normally respectively engaging the opposite sides of said other end portion.

12. The device of claim 11 wherein said one elongated element is rotatably secured to and extends through said driving member, and further comprising means on said one elongated element for selectively rotating the same, and means for locking said one elongated element in a selected rotational position.

13. The device of claim 12 wherein said one elongated element is disposed radially outwardly from said one elongated element in said first position of said rotatable member.

References Cited in the file of this patent

UNITED STATES PATENTS

| | | |
|---|---|---|
| 1,030,229 | Cheney | June 18, 1912 |
| 2,123,087 | Leighton | July 5, 1938 |
| 2,547,483 | Mersereau | Apr. 3, 1951 |
| 2,634,454 | Altenburger | Apr. 14, 1953 |
| 2,770,832 | Martin | Nov. 20, 1956 |